United States Patent
Yang et al.

(10) Patent No.: US 9,762,109 B2
(45) Date of Patent: Sep. 12, 2017

(54) PERMANENT MAGNET BRUSHLESS MOTOR

(71) Applicant: Johnson Electric S.A., Murten (CH)

(72) Inventors: Bo Yang, Shenzhen (CN); Gang Liu, Shenzhen (CN); Tao Zhang, Shenzhen (CN); San Yuan Xiao, Shenzhen (CN); Wai Chiu Tang, Hong Kong (CN)

(73) Assignee: JOHNSON ELECTRIC S.A., Murten (CH)

(*) Notice: Subject to any disclaimer, the term of this patent is extended or adjusted under 35 U.S.C. 154(b) by 211 days.

(21) Appl. No.: 14/658,897

(22) Filed: Mar. 16, 2015

(65) Prior Publication Data
US 2015/0280535 A1 Oct. 1, 2015

(30) Foreign Application Priority Data
Mar. 26, 2014 (CN) .......................... 2014 1 0118233

(51) Int. Cl.
| | |
|---|---|
| H02K 1/16 | (2006.01) |
| H02K 21/14 | (2006.01) |
| H02K 29/03 | (2006.01) |
| H02K 1/14 | (2006.01) |
| H02K 1/27 | (2006.01) |

(52) U.S. Cl.
CPC ............ *H02K 21/14* (2013.01); *H02K 1/146* (2013.01); *H02K 1/165* (2013.01); *H02K 1/278* (2013.01); *H02K 1/2733* (2013.01); *H02K 29/03* (2013.01); *H02K 2213/03* (2013.01)

(58) Field of Classification Search
CPC ........ H02K 1/165; H02K 21/14; H02K 1/146; H02K 1/2733; H02K 1/278; H02K 2213/03; H02K 29/03

USPC ...................... 310/156.38, 216.055, 216.091
See application file for complete search history.

(56) References Cited

U.S. PATENT DOCUMENTS

| | | | | |
|---|---|---|---|---|
| 5,345,133 | A * | 9/1994 | Satake ................... | H02K 21/12 310/156.45 |
| 5,682,072 | A * | 10/1997 | Takahashi ............ | H02K 1/2733 310/156.46 |
| 5,962,999 | A * | 10/1999 | Nakamura ............... | H02P 6/10 318/400.31 |
| 6,218,753 | B1 * | 4/2001 | Asano ..................... | H02K 1/276 310/156.53 |

(Continued)

FOREIGN PATENT DOCUMENTS

| | | |
|---|---|---|
| JP | H0479740 A | 3/1992 |
| JP | H05207687 A | 8/1993 |

*Primary Examiner* — Alex W Mok
(74) *Attorney, Agent, or Firm* — Muncy, Geissler, Olds & Lowe, P.C.

(57) ABSTRACT

A permanent magnet brushless motor has a stator and a rotor. The stator has a yoke and s teeth extending from the yoke, forming a stator core, where s is an integer greater than four. Coils of a stator winding are wound about the teeth. The rotor has a shaft, a rotor core fixed to the shaft and a permanent magnet mounted to the rotor core. The permanent magnet forms p magnetic poles, where p is an even number greater than 2 but less than s. Each section of the permanent magnet corresponding to a respective magnetic pole is divided into n equal parts by n−1 magnet grooves, where n is an integer greater than 1 and p*n is an integral multiple of s. The magnet grooves significantly increase the detent torque of the motor.

11 Claims, 6 Drawing Sheets

(56) References Cited

U.S. PATENT DOCUMENTS

| | | | | |
|---|---|---|---|---|
| 6,784,582 | B1* | 8/2004 | Kolomeitsev | H02K 1/2733 |
| | | | | 310/156.01 |
| 6,940,198 | B2* | 9/2005 | Ionel | H02K 1/2733 |
| | | | | 310/156.47 |
| 7,839,045 | B2* | 11/2010 | Wu | H02K 29/03 |
| | | | | 310/156.38 |
| 8,247,941 | B2* | 8/2012 | Okubo | H02K 1/278 |
| | | | | 310/156.37 |
| 2005/0225190 | A1* | 10/2005 | Kinashi | H02K 1/2733 |
| | | | | 310/156.13 |
| 2006/0055266 | A1* | 3/2006 | Iwami | B22F 7/062 |
| | | | | 310/156.47 |
| 2012/0001509 | A1* | 1/2012 | Yamada | H02K 1/2746 |
| | | | | 310/156.15 |
| 2012/0058313 | A1* | 3/2012 | Nagai | H02K 1/16 |
| | | | | 428/195.1 |
| 2012/0194024 | A1* | 8/2012 | Okada | H02K 1/278 |
| | | | | 310/156.01 |
| 2014/0217847 | A1* | 8/2014 | Kwan | H02K 1/2793 |
| | | | | 310/156.38 |
| 2014/0265703 | A1* | 9/2014 | Yamada | H02K 1/2746 |
| | | | | 310/156.38 |

\* cited by examiner

| Motor No. | Detent Torque (mNm) | | Zero Load | | | | Load | | | |
|---|---|---|---|---|---|---|---|---|---|---|
| | | | CCW | | CW | | CCW | | CW | |
| | CCW | CW | Electrical Current(A) | Rotational Speed (RPM) | Electrical Current(A) | Rotational Speed (RPM) | Electrical Current(A) | Rotational Speed (RPM) | Electrical Current(A) | Rotational Speed (RPM) |
| #1 | 24.1 | 23.5 | 0.19 | 3591 | 0.18 | 3591 | 0.6 | 3593 | 0.61 | 3589 |
| #2 | 23.6 | 24.2 | 0.18 | 3572 | 0.16 | 3575 | 0.59 | 3574 | 0.58 | 3574 |
| #3 | 24.5 | 23.8 | 0.16 | 3603 | 0.15 | 3592 | 0.57 | 3607 | 0.58 | 3610 |
| #4 | 24.3 | 24.7 | 0.19 | 3583 | 0.16 | 3583 | 0.60 | 3578 | 0.59 | 3581 |
| | | | | | | | | | | |
| Average | 24.1 | 24.0 | 0.18 | 3587 | 0.16 | 3585 | 0.59 | 3588 | 0.59 | 3589 |
| Max | 24.5 | 24.7 | 0.19 | 3603 | 0.18 | 3592 | 0.6 | 3607 | 0.61 | 3610 |
| Min | 23.6 | 23.5 | 0.16 | 3572 | 0.15 | 3575 | 0.57 | 3574 | 0.58 | 3574 |

FIG. 4

| Motor No. | Detent Torque (mNm) | | Zero Load | | | | Load | | | |
|---|---|---|---|---|---|---|---|---|---|---|
| | | | CCW | | CW | | CCW | | CW | |
| | CCW | CW | Electrical Current(A) | Rotational Speed (RPM) | Electrical Current(A) | Rotational Speed (RPM) | Electrical Current(A) | Rotational Speed (RPM) | Electrical Current(A) | Rotational Speed (RPM) |
| #5 | 9.8 | 10.3 | 0.13 | 3561 | 0.13 | 3563 | 0.52 | 3564 | 0.52 | 3563 |
| #6 | 11.7 | 12.2 | 0.14 | 3590 | 0.13 | 3599 | 0.54 | 3591 | 0.53 | 3595 |
| #7 | 12.2 | 12.2 | 0.13 | 3544 | 0.13 | 3548 | 0.52 | 3547 | 0.53 | 3544 |
| #8 | 9.8 | 8.8 | 0.13 | 3647 | 0.13 | 3647 | 0.56 | 3645 | 0.54 | 3650 |
| | | | | | | | | | | |
| Average | 10.9 | 10.9 | 0.13 | 3586 | 0.13 | 3589 | 0.54 | 3587 | 0.53 | 3588 |
| Max | 12.2 | 12.2 | 0.14 | 3647 | 0.13 | 3647 | 0.56 | 3645 | 0.54 | 3650 |
| Min | 9.8 | 8.8 | 0.13 | 3544 | 0.13 | 3548 | 0.52 | 3547 | 0.52 | 3544 |

FIG. 5

100
PERMANENT MAGNET BRUSHLESS MOTOR

CROSS REFERENCE TO RELATED APPLICATIONS

This non-provisional patent application claims priority under 35 U.S.C. §119(a) from Patent Application No. 201410118233.1 filed in The People's Republic of China on Mar. 26, 2014, the entire contents of which are hereby incorporated by reference.

FIELD OF THE INVENTION

This invention relates to electric motors and in particular, to a permanent magnet brushless motor. The invention may be applied to either BLDC or BLAC motors.

BACKGROUND OF THE INVENTION

Existing brushless direct current motors include an outer stator and an inner rotor rotatably mounted to the stator. The inner rotor includes a rotor core and a permanent magnet fixed to the rotor core to form an even number of magnetic poles on the rotor. The outer stator includes an annular stator core, a stator winding wound around inwardly-extending teeth of the stator core, and an electronic commutation circuit mounted to one end of the stator core.

Traditional permanent magnet brushless (PMBL) motors have low to average detent torque but some applications require a large detent torque thus rendering PMBL motors unsuitable for these applications.

Thus there is a desire for a PMBL motor with an increased detent torque.

SUMMARY OF THE INVENTION

Accordingly, the present invention provides a permanent magnet brushless motor having a stator and a rotor rotatable mounted to the stator, the stator comprising a stator core and a stator winding, the rotor comprising a shaft, a rotor core fixed to the shaft, and a permanent magnet mounted to a surface of the rotor core, wherein the stator core comprises an annular yoke and s teeth extending from the yoke, where s is an integer greater than four, each tooth is wound with the stator winding, and ends of the teeth face the permanent magnet; the permanent magnet forms p magnetic poles, where p is an even number greater than 2 but less than s; and each section of the permanent magnet corresponding to a respective magnetic pole is divided into n equal parts in a circumferential direction of the rotor by n−1 magnet grooves, where n is an integer greater than 1 and p*n is an integral multiple of s, the magnet grooves being formed in a surface of the permanent magnet facing the stator core.

Preferably, the permanent magnet is a ring magnet having p*n magnet grooves which divide the magnet into p*n equal parts in the circumferential direction of the rotor.

Preferably, the motor is an inner rotor motor, with the stator core surrounding the rotor core, and the p*n magnet grooves are formed in a radially outer circumferential surface of the ring magnet.

Preferably, a radially outer circumferential surface of the rotor core has p axially-extending rotor core grooves, and each rotor core groove is aligned with an interface between two corresponding adjacent magnetic poles of the p magnetic poles.

Alternatively, the permanent magnet comprises a plurality of individual magnets, each individual magnet forming one magnetic pole, the surface of each individual magnet facing the stator core has n−1 magnet grooves which divide the individual magnet into n equal parts in the circumferential direction of the rotor.

Preferably, the individual magnets are spaced apart from each other, a width of each magnet groove measured in the circumferential direction of the rotor is substantially the same as a gap between adjacent individual magnets.

Preferably, the individual magnets are curved magnets.

Preferably, each tooth has a pole face facing the rotor core, and an auxiliary groove is formed at a center of the pole face of the tooth.

Preferably, the yoke of the stator core is annular, and an outer circumferential surface of the yoke has s yoke grooves, each yoke groove being aligned with a center of a corresponding tooth.

Preferably, s is six, p is four, and n is three.

Preferably, the stator core is formed from laminations and at least one axially extending yoke groove is formed in the yoke and having a protrusion formed therein, the laminations being welded together at the protrusion.

In summary, the permanent magnet of the motor of the present invention has magnet grooves which divide the section of the permanent magnet corresponding to each magnetic pole into multiple equal parts, such that the number of the fluctuations of the magnetic field is an integral multiple of the stator slots, thereby significantly increasing the detent torque of the motor without changing the motor pole and slot number and without significantly changing the motor performance.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 4 shows test results of four motors made according to the present invention;

FIG. 5 shows test results of four prior art motors; and

DETAILED DESCRIPTION OF THE PREFERRED EMBODIMENTS

Figure 1:
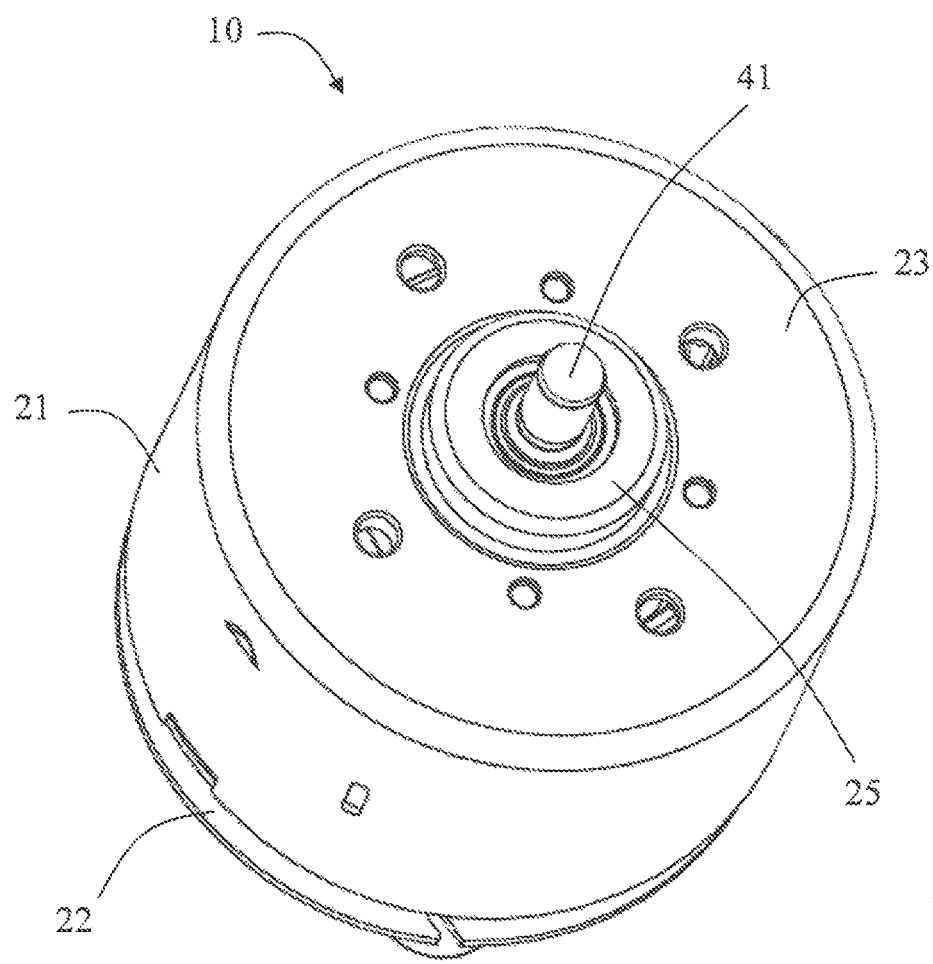
FIG. 1 illustrates a permanent magnet brushless motor according to me preferred embodiment of the present invention.
Figure 2:
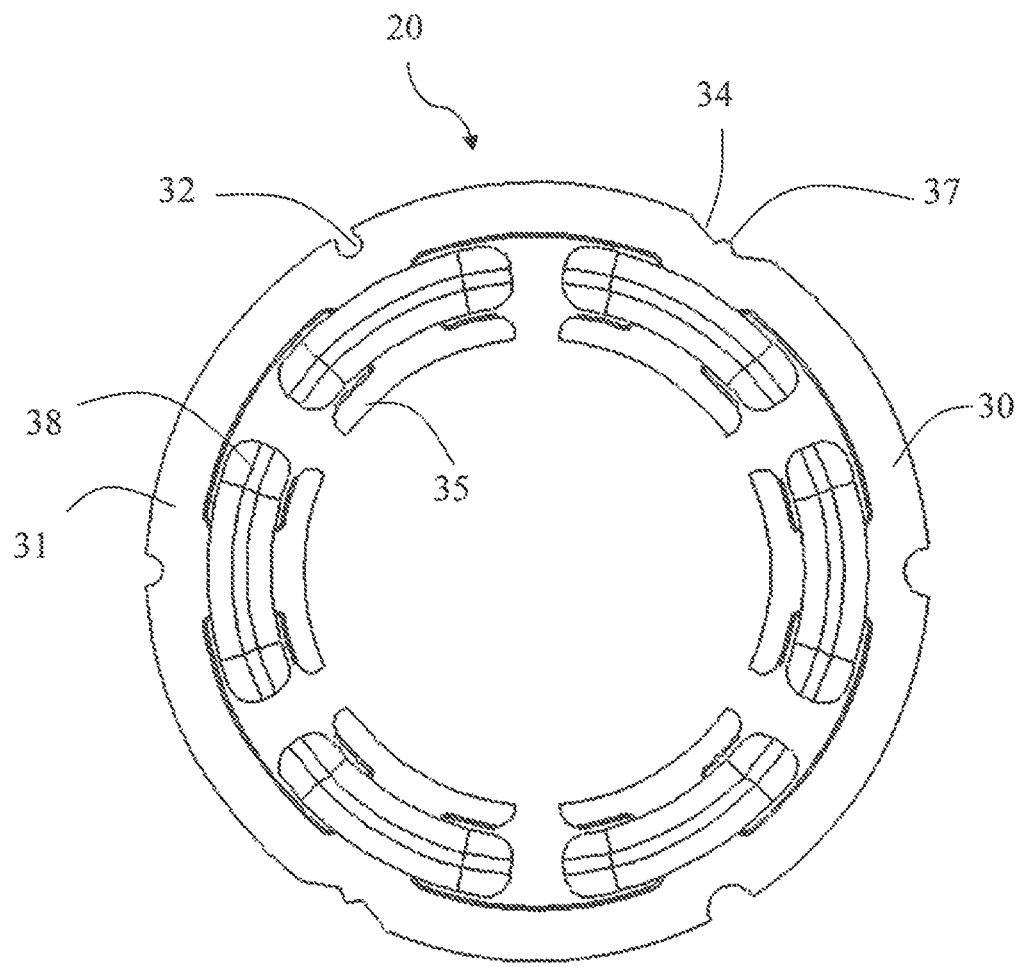
FIG. 2 illustrates the stator core and stator winding of the brushless motor of FIG. 1.
Figure 3:
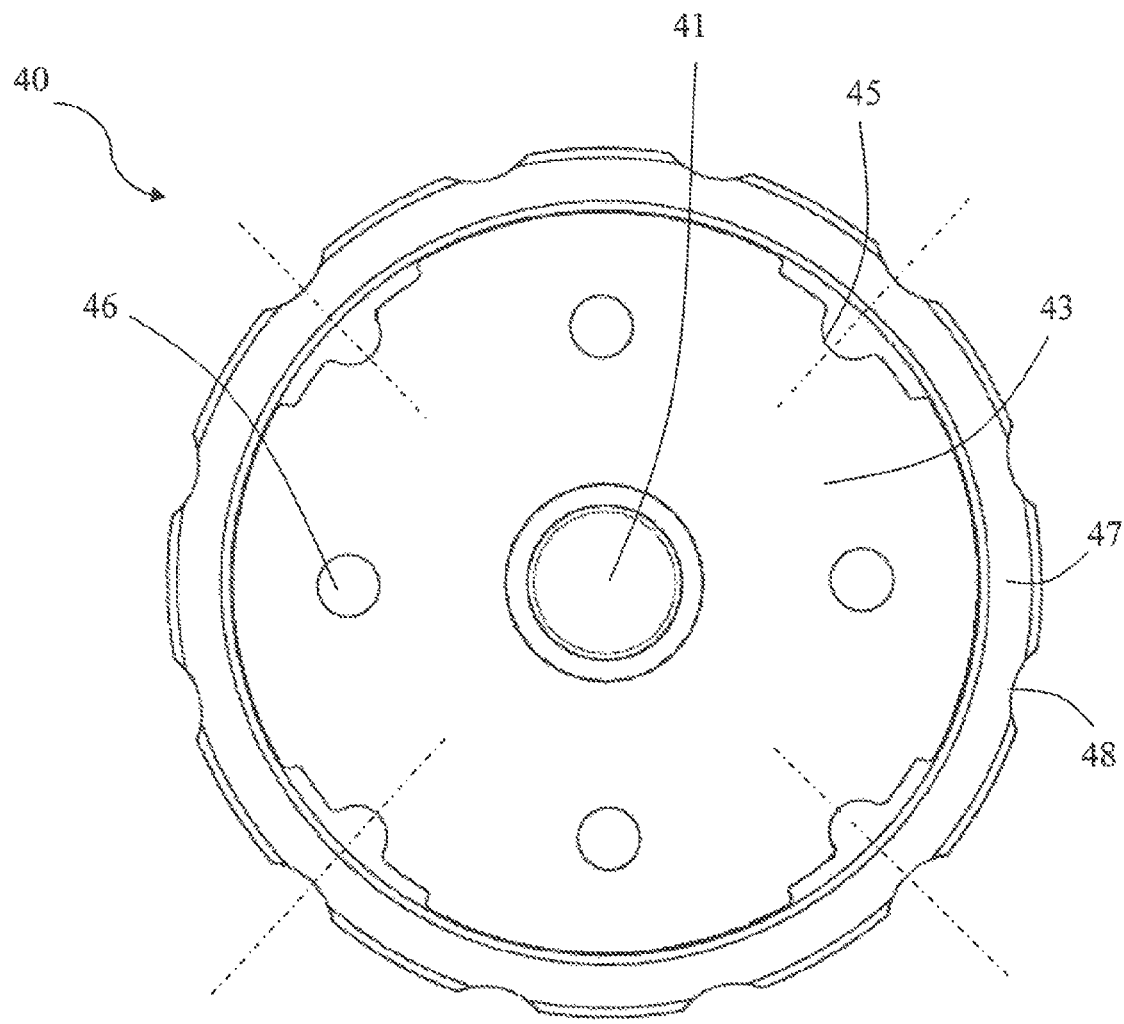
FIG. 3 illustrates the rotor core and permanent magnet of the brushless motor of FIG. 1.

Referring to FIG. 1 to FIG. 3, the permanent magnet brushless motor 10 in accordance with the preferred embodiment of the present invention, includes an outer stator 20 and an inner rotor 40. The stator 20 includes a cup-like housing 21 with an open end, and a closed end. The open end is closed by an end cap 22. A stator core 30 is received in the housing 21, a stator winding 38 is wound around teeth 35 of the stator core 35, and a driving circuit (e.g. electronic commutation circuit). The stator core is preferably formed by stacking together a number of laminations which are welded or otherwise fixed together.

The rotor 40 includes a shaft 41, a rotor core 43 fixed to the shaft 41, and a permanent magnet 47 mounted to an outer peripheral surface of the rotor core 43. The shall 41 is rotatably mounted to the end cap 22 and the closed end 23 of the housing 21 by bearings 25.

The stator core 30 includes an annular yoke 31 and six teeth 35 extending inwardly from the yoke 31, with winding slots formed between adjacent teeth 35. Each tooth 35 is wound with a coil of the stator winding 38. Under the control of the driving circuit, the stator winding 38 causes the stator to form six stator poles. That is, each tooth 35 forms one stator pole.

The permanent magnet 47 is an annular or ring magnet which is magnetized to form four magnetic poles arranged in the circumferential direction of the rotor core. Therefore, the motor may be referred to as a four-pole (four magnetic poles) six-slot (six winding slots) motor. Alternatively, the permanent magnet 47 may be formed by a number of flat or arcuate permanent magnets arranged in a ring configuration on the rotor core In the present embodiment, twelve axially extending magnet grooves 48 are formed in an outer peripheral surface of the permanent magnet 47. These twelve magnet grooves 48 are evenly spaced in the circumferential direction of the rotor core to divide the annular permanent magnet into twelve equal parts. The number of the divided parts is an integral multiple of the number of the stator teeth. Preferably, the groove 48 has a curved cross-section. All the magnet grooves 48 have the same circumferential size and radial depth. Preferably, the depth of each magnet groove 48 is smaller than 20% of the thickness of the magnet, measured in the radial direction of the rotor.

The permanent magnet 47 forms four magnetic poles. Therefore, each section of the permanent magnet corresponding to a magnetic pole includes three parts of the twelve divided equal parts. More specifically, each section of the permanent magnet corresponding to a magnetic pole is divided into three equal parts by two magnet grooves 48, and an interface between adjacent magnetic poles is aligned with a corresponding magnet groove 48. Each section of the permanent magnet corresponding to a magnetic pole includes two symmetrical complete grooves 48 and two symmetrical half-grooves.

Four brushless motors (#1, #2, #3 and #4) made in accordance with the above embodiment were tested for electrical current (A), rotational speed (RPM) and detent torque (mNm) when rotating clockwise (CW) and counter-clockwise (CCW) under zero-load and load conditions. The test results are shown in FIG. 4. The average detent torque of the four motors when rotating counter-clockwise was 24.1 mNm, with a maximum of 24.5 mNm and a minimum of 23.6 mNm. The average detent torque of the four motors when rotating clockwise was 24.0 mNm, with a maximum of 24.7 mNm and a minimum of 23.5 mNm.

Another four motors (#5, #6, #7 and #8) having the same configuration but without the magnet grooves 48 were also tested. The test results are shown in FIG. 5. The average detent torque of the four motors when rotating counter-clockwise was only 10.9 mNm, with a maximum of only 12.2 mNm and a minimum of 9.8 mNm. The average detent torque of the four motors when rotating clockwise was 10.9 mNm, with a maximum of 12.2 mNm and a minimum of 8.8 mNm.

As can be seen, the present invention can substantially double the detent torque, thus significantly increasing the motor detent torque while maintaining the motor performance.

It should be understood that the above four-pole (four permanent magnetic poles) six-slot (six winding slots) motor is described herein for the purpose of illustration only and the present invention could be equally applied in motors having different numbers of magnetic poles and winding slots.

The present invention can be applied in a p-pole (the rotor has p magnetic poles) s-slot (the stator has s teeth) permanent magnet brushless motor, where s is an integer greater than four, the permanent magnet of the rotor forms p magnetic poles, and p is an even number greater than 2 but less than s. The section of the permanent magnet corresponding to each magnetic pole is divided into n equal parts along the circumferential direction of the rotor by n−1 grooves, where n is an integer greater than 1 and p*n is an integral multiple of s. After being magnetized, the magnetic field fluctuates p*n times, and the number of the stator teeth is s. Therefore, the number of the fluctuations of the magnetic field is an integral multiple of the tooth number, thereby significantly increasing the cogging torque.

The permanent magnet used in the rotor may be a ring permanent magnet magnetized to form p magnetic poles in the circumferential direction of the rotor.

Figure 7:
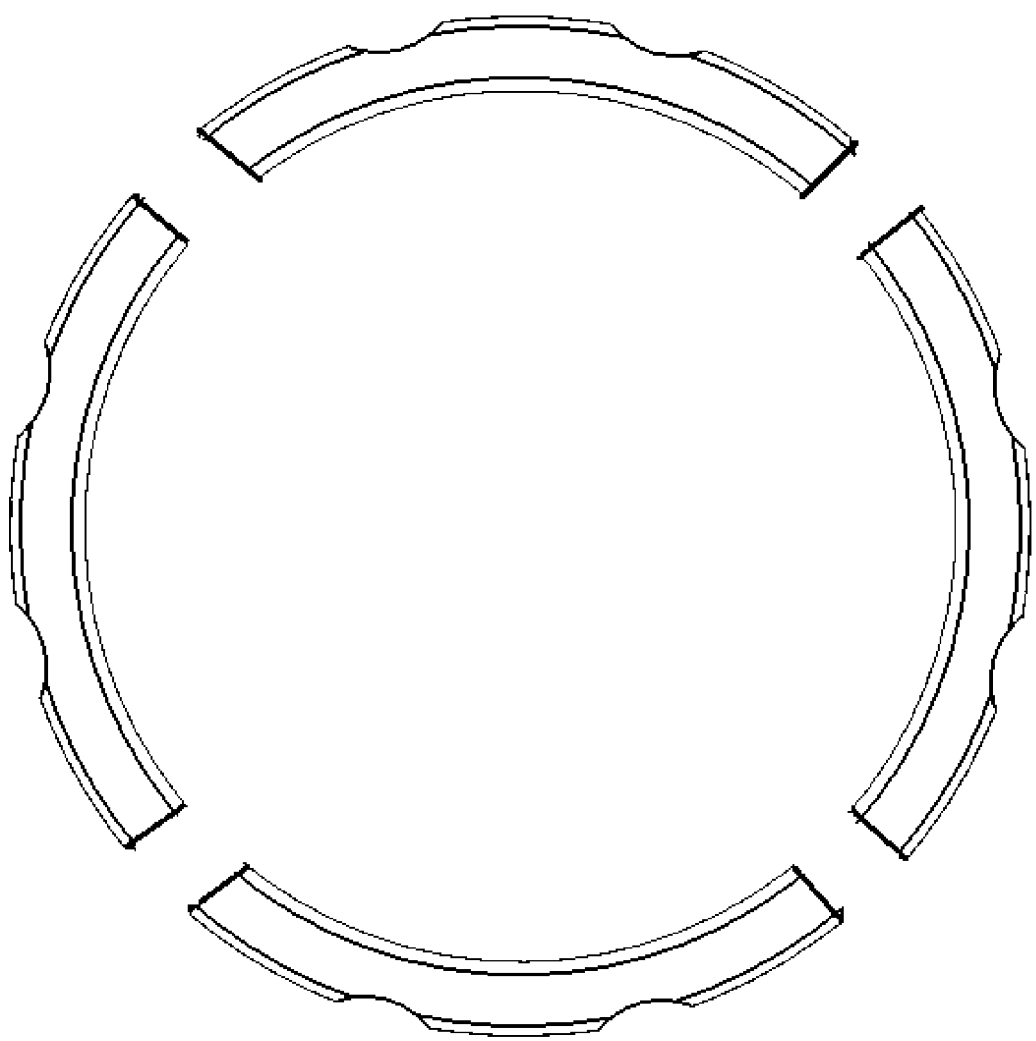
FIG. 7 illustrates a permanent magnet of the brushless motor in accordance with an alternative embodiment of the present invention.

It should be understood that the permanent magnet used in the rotor may also be formed by p individual permanent magnets arranged in the circumferential direction of the rotor, each individual permanent magnet forming one magnetic pole, as shown in FIG. 7.

Preferably, the grooves on the outer surface of the magnet are located on the radially outer surface of the permanent magnet. If the rotor uses p curved permanent magnets, the p curved permanent magnets may be spaced apart, with each curved permanent magnet having n−1 grooves, and the width of each groove in the circumferential direction of the rotor is substantially the same as the width of the gap between adjacent individual permanent magnets.

Preferably, p axially-extending rotor core grooves 45 are further formed on the outer circumferential surface of the rotor core 43, the center line of each rotor core groove 45 is aligned with the interface between two corresponding magnetic poles. The provision of the rotor core grooves 45 can prevent short-circuit of the magnetic flux at the interface which would cause the flux to directly travel from the S pole to the N pole.

Preferably, the rotor core 43 has multiple positioning holes 46 for positioning the rotor core during the magnetizing process.

Preferably, s yoke grooves 32, 34 are formed on the outer peripheral surface of the annular yoke 31 of the stator core, each yoke groove is aligned with the center of a corresponding tooth. The axial ends of the stator core are covered by end covers or wire bobbins of insulating material, preferably plastic, to protect the windings from the stator core. Yoke grooves 32 are used to align the wire bobbins with the stator core during assembly of the motor. In the present embodiment, the yoke grooves 32 are arcuate in shape. Each yoke groove 32 may be the same shape, but preferably, at least one yoke groove 32 is a different shape or size in order to circumferentially align the wire bobbins. A protrusion 37 projects outwardly from a central location of the yoke groove 34 and is used for welding the laminations together. More specifically, the yoke 31 includes two yoke grooves 34 and four yoke grooves 32. The two yoke grooves 34 are diametrically opposed to each other such that the laminations for forming the yoke are welded together at the protrusions 37 of the yoke grooves 34.

Figure 6:
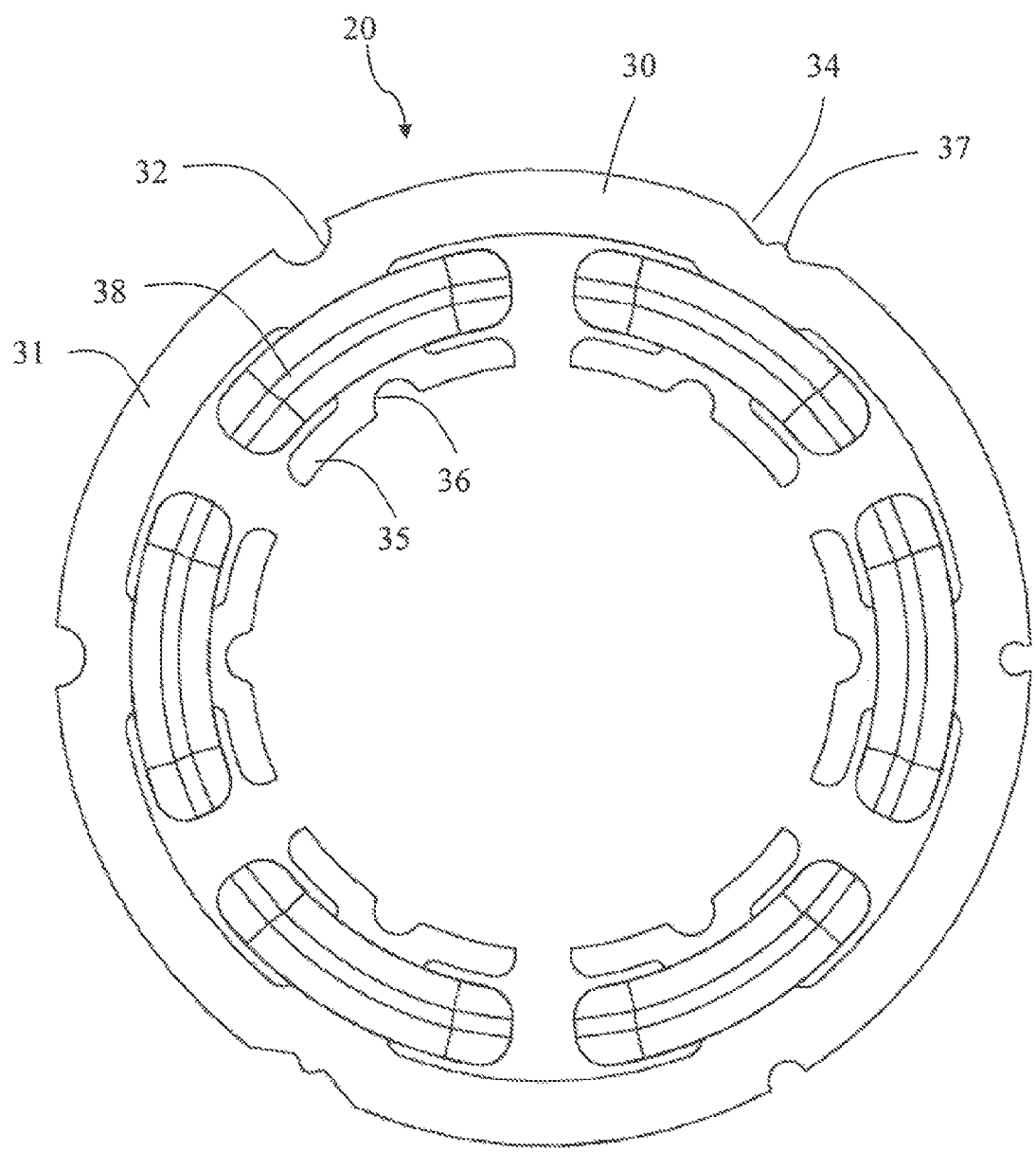
FIG. 6 illustrates the stator core and stator winding of a brushless motor according to another embodiment of the present invention.

FIG. 6 illustrates a motor stator according to another embodiment of the present invention. This motor stator differs from the motor stator of FIG. 2 mainly in that a pole face groove 36 (referred to as an auxiliary groove) is formed at a center of a pole face of each tooth 35 of the stator, for dividing the pole face into two equal parts. Forming the auxiliary groove 36 in the pole face of each tooth can further increase the detent torque of the motor.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

It will be apparent to those skilled in the art that various modifications and variations can be made to the disclosed structure without departing from the scope or spirit of the invention. For example, in addition to the above-described inner rotor motor, the motor may also be an outer rotor motor, i.e. the rotor is disposed surrounding the stator; the stator core may be an integrated structure as described above as well as a separated structure, which are all within the scope of the present invention. In view of the foregoing, it is intended that the present invention cover modifications and variations of this invention provided they fall within the scope of the following claims and their equivalents.

The invention claimed is:

1. A permanent magnet brushless motor, comprising:
   a stator, the stator comprising:
      a stator core; and
      a stator winding; and
   a rotor rotatably mounted to the stator, the rotor comprising:
      a shaft;
      a rotor core fixed to the shaft; and
      a permanent magnet mounted to a surface of the rotor core,
   wherein the stator core comprises an annular yoke and s teeth extending from the yoke, where s is an integer greater than four, each tooth is wound with the stator winding, and ends of the teeth face the permanent magnet,
   wherein the permanent magnet forms p magnetic poles, where p is an even number greater than 2 but less than s, and
   wherein each section of the permanent magnet corresponding to a respective magnetic pole is divided into n equal parts in a circumferential direction of the rotor by n−1 magnet grooves which are spaced from boundaries between adjacent magnetic poles, where n is an integer greater than 1 and p*n is an integral multiple of s, the magnet grooves being formed in a surface of the permanent magnet facing the stator core.

2. The motor of claim 1, wherein the permanent magnet is a ring magnet having p*n magnet grooves which divide the magnet into p*n equal parts in the circumferential direction of the rotor.

3. The motor of claim 2, wherein the motor is an inner rotor motor, wherein the stator core surrounds the rotor core, and the p*n magnet grooves are formed in a radially outer circumferential surface of the ring magnet.

4. The motor of claim 3, wherein a radially outer circumferential surface of the rotor core has p axially-extending rotor core grooves, and each rotor core groove is aligned with an interface between two corresponding adjacent magnetic poles of the p magnetic poles.

5. The motor of claim 1, wherein the permanent magnet comprises a plurality of individual magnets, each individual magnet forming one magnetic pole, the surface of each individual magnet facing the stator core has n−1 magnet grooves which divide the individual magnet into n equal parts in the circumferential direction of the rotor.

6. The motor of claim 5, wherein the individual magnets are spaced apart from each other, a width of each magnet groove measured in the circumferential direction of the rotor is substantially the same as a gap between adjacent individual magnets.

7. The motor of claim 6, wherein the individual magnets are curved magnets.

8. The motor of claim 1, wherein each tooth has a pole face facing the rotor core, and an auxiliary groove is formed at a center of the pole face of the tooth.

9. The motor of claim 1, wherein the yoke of the stator core is annular, and an outer circumferential surface of the annular yoke has s yoke grooves, each yoke groove being aligned with a center of a corresponding tooth.

10. The motor of claim 1, wherein s is six, p is four, and n is three.

11. The motor of claim 1, wherein the stator core is formed from laminations and at least one axially extending yoke groove is formed in the yoke and having a protrusion formed therein, the laminations being welded together at the protrusion.

* * * * *